(12) United States Patent
Yorimitsu

(10) Patent No.: US 6,710,960 B1
(45) Date of Patent: Mar. 23, 2004

(54) INFORMATION STORAGE APPARATUS AND METHOD OF CONTROLLING THE SAME

(75) Inventor: Keiichi Yorimitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/537,422

(22) Filed: Mar. 29, 2000

(30) Foreign Application Priority Data

Aug. 26, 1999 (JP) ............................................ 11-240500

(51) Int. Cl.⁷ ............................................... G11B 19/02
(52) U.S. Cl. ........................................................ 360/69
(58) Field of Search .............................. 360/48, 69, 51

(56) References Cited

U.S. PATENT DOCUMENTS

| | | | | |
|---|---|---|---|---|
| 4,298,897 A | * | 11/1981 | Arter et al. .................... | 360/39 |
| 5,519,869 A | * | 5/1996 | Payne et al. .................... | 713/2 |
| 6,088,177 A | * | 7/2000 | Onoda et al. .................. | 360/48 |
| 6,195,218 B1 | * | 2/2001 | Guttmann et al. ............. | 360/51 |
| 6,445,525 B1 | * | 9/2002 | Young ........................... | 360/51 |
| 6,560,052 B2 | * | 5/2003 | Ng et al. ....................... | 360/48 |

* cited by examiner

Primary Examiner—David Hudspeth
Assistant Examiner—Mitchell Slavitt
(74) Attorney, Agent, or Firm—Greer, Burns & Crain, Ltd.

(57) ABSTRACT

An information storage apparatus that adjusts to different recording densities of a recording medium. The information storage apparatus includes a flash ROM that stores a plurality of control parameters corresponding to different recording densities, and a micro-controller unit (MCU) that sets one control parameter among the plurality of control parameters stored in the flash ROM, determines whether the set control parameter is suitable for reading data from the recording medium, and selects the control parameter determined to be suitable.

8 Claims, 6 Drawing Sheets

INFORMATION STORAGE APPARATUS AND METHOD OF CONTROLLING THE SAME

BACKGROUND OF THE INVENTION

1. Field of the Invention

The present invention generally relates to information storage apparatuses, and, more particularly, to an information storage apparatus that performs optimum data read/write operations regardless of the recording density of the recording medium. The present invention also relates to a method of controlling such an information storage apparatus.

2. Description of the Related Art

FIG. 1 is a block diagram of a conventional magnetic disk unit 20 that comprises: a hard disk controller (HDC) 4 connected to a host computer 12 via a small computer system interface (SCSI); a data buffer 5 and a random access memory (RAM) 3 connected to the HDC 4; a flash ROM 2 connected to the RAM 3, a micro-controller unit (MCU) 1 connected to the flash ROM 2; a drive interface 6 connected to the MCU 1 and the HDC 4; a servo driver 8 and a digital signal processor (DSP) 7 both connected to the driver interface 6; a read channel 10 connected to the drive interface 8 and the HDC 4; a servo demodulator 9 connected to the drive interface 6 and the read channel 10; and a disk enclosure 11, which contains a magnetic disk, connected to the servo driver 8 and the read channel 10.

FIGS. 2A and 2B show track formats of servo information each recorded on a data surfaces of a magnetic disk partitioned by means of a conventional embedded servo technique.

More specifically, FIG. 2A shows the format of a track on a magnetic disk partitioned by index information 21: every three data sectors 23 are separated by servo frames 22. Servo information is written to the magnetic disk unit 20 by a read/write head, and is used for positioning the head. The partitioning of the data sectors 23 and the data density controlled magnetic disk may be varied by changing the data write frequency, for instance. The recording density is 12 sectors per track.

FIG. 2B shows the format of another track partitioned by index information 21: every four data sectors 23 are separated by the servo frames 22, so that the recording density of the track format is 16 sectors per track, while the recording density of the track format of FIG. 2A is 12 sectors per track.

Where the recording densities of the disks differ, two types of firmware must be installed, so that two different magnetic disk units must be produced.

From the financial and developmental viewpoint, magnetic disk units having the same drive engine must be customized in order to provide for differences in their peripheral functions. More specifically, if there is a demand for magnetic disk units having different functions, it is more troublesome to produce different magnetic disk units than to customize the magnetic disk units having the same drive engine. Accordingly, the firmware of each magnetic disk unit is independently produced in accordance with each corresponding customizing request, while the hardware is the same for all the magnetic disk units. A firmware design change is more easily and quickly accomplished than a hardware design change. Nevertheless, it is preferable to maximize the number of common elements in firmware.

More specifically, some clients prefer their customized magnetic disk units to have the maximum recording capacity, while others prefer a reduced recording capacity in their customized magnetic disk units. When a client requests a recording capacity beyond the standard range, the track density would be increased to its maximum, and the system usage area, such as log storage area and defective sector area, would be reduced.

Magnetic disk units with different types of firmware are accordingly produced with different recording densities. Unfortunately, read/write operations can be performed only when magnetic disks have a fixed recording density. With conventional magnetic disk units, read/write operations performed on magnetic disks having different recording densities are prone to errors that are often difficult to detect, and the magnetic disk units might overrun without providing an error indication.

SUMMARY OF THE INVENTION

A general object of the present invention is to provide information storage apparatuses and information storage apparatus control methods in which the above disadvantages are eliminated.

A more specific object of the present invention is to provide an information storage apparatus that adjusts to different recording densities, and a method of controlling such an information storage apparatus.

The above objects of the present invention are achieved by an information storage apparatus that performs read/write operations on a recording medium, comprising:

a storage unit that stores a plurality of control parameters corresponding to the different recording densities that the recording medium;

a control unit that sets one of the plurality of control parameters stored in the storage unit at the time of activation, determines whether the set control parameter is suitable for properly reading out data from the recording medium, and selects the control parameter determined to be suitable for controlling the recording medium among the plurality of control parameters.

In this information storage apparatus, a suitable control parameter is selected in accordance with the recording density of the recording medium, so that a data read/write operation can be properly performed regardless of the recording density of the recording medium.

The above objects of the present invention are also achieved by an information storage apparatus which performs a data read/write operation on a recording medium, comprising:

a formatting unit which formats the recording medium at a recording density corresponding to a set command inputted.

In this information storage apparatus, the recording density of the recording medium can be easily changed.

The above objects of the present invention are also achieved by a method of controlling an information storage apparatus which performs a data read/write operation on a recording medium, the method comprising the steps of:

setting one control parameter among a plurality of control parameters corresponding to recording densities that the recording medium can have;

determining whether the set control parameter is suitable for properly reading data from the recording medium; and selecting the control parameter determined to be suitable for properly reading the data from the recording medium among the plurality of control parameters.

The above objects of the present invention are also achieved by a method of controlling an information storage apparatus which performs a data read/write operation on a recording medium, the method comprising the steps of:

formatting the recording medium at a recording density corresponding to a set command inputted.

The above and other objects and features of the present invention will become more apparent from the following description taken in conjunction with the accompanying drawings.

BRIEF DESCRIPTION OF THE DRAWINGS

FIG. 4 is a flowchart of the operation of the magnetic disk unit in accordance with the present invention when the unit is switched on;

DESCRIPTION OF THE PREFERRED EMBODIMENTS

The following is a detailed description of embodiments of the present invention, with reference to the accompanying drawings.

Figure 1:
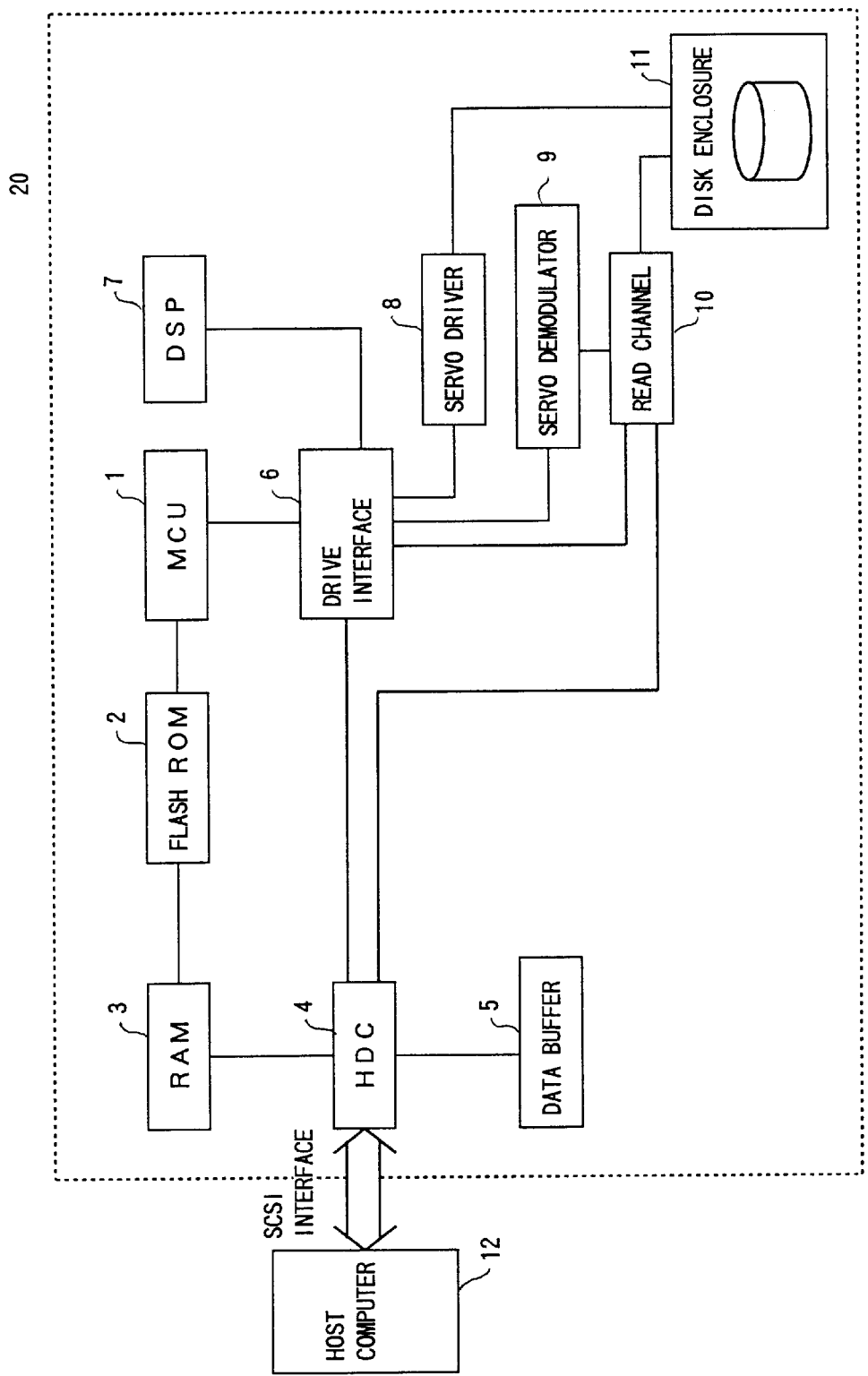
FIG. 1 is a block diagram a conventional magnetic disk unit.

The structure and function of the magnetic disk unit of the present invention are similar to those of the conventional magnetic disk unit 20 of FIG. 1, except for the information stored in the flash ROM 2 and the function of the MCU 1.

Figure 3:
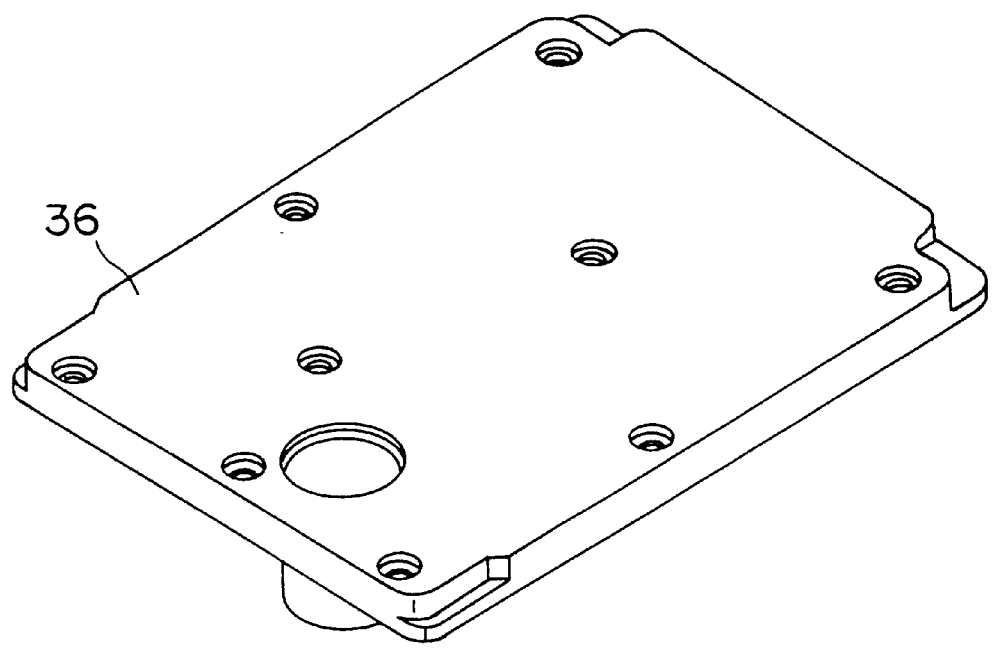
FIG. 3 is a perspective view of a magnetic disk unit in accordance with the present invention.
Figure 3:
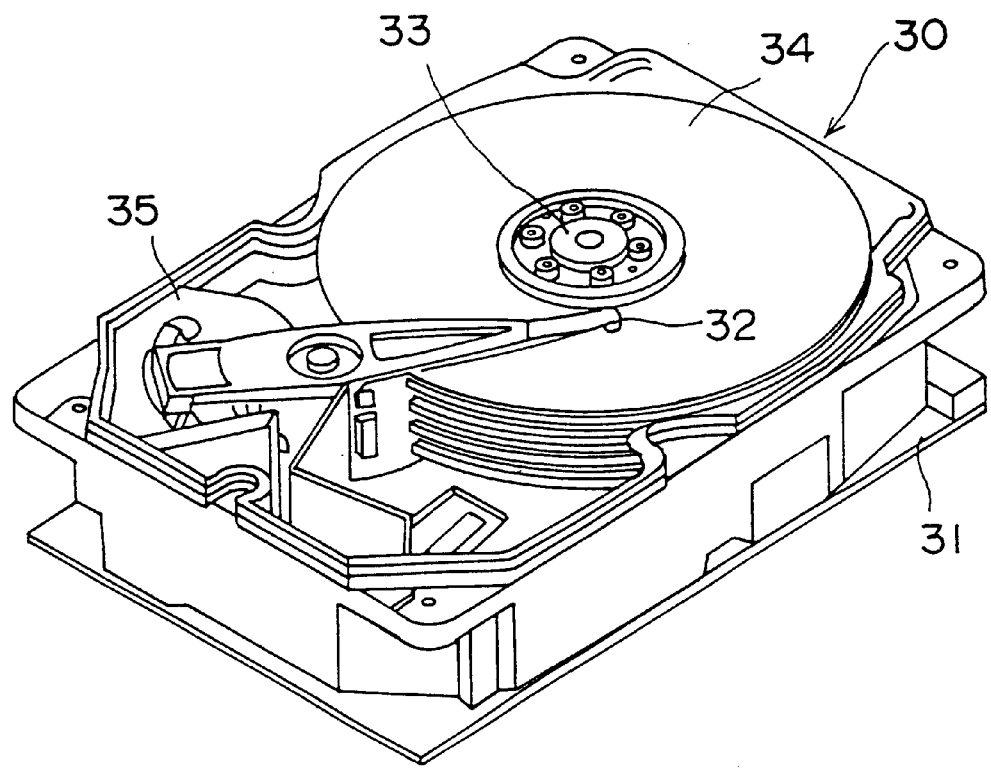

FIG. 3 is a perspective view of a magnetic disk unit in accordance with the present invention. As shown in FIG. 3, the magnetic disk unit 30 comprises a magnetic disk 34, a spindle motor 33 for rotating the magnetic disk 34, a magnetic read/write head 32 for reading data from or writing data to the magnetic disk 34, and an actuator 35 for driving the head 32. The magnetic disk 34, the spindle motor 33, the head 32 and the actuator 35 are all arranged on a base 31, and are covered with a cover 36.

Drive parameters that determines the operation of drive processors, such as the DSP 7, are stored in the non-volatile flash ROM 2. Since the drive parameters determine the internal operations of the drive, they should not be lost when the power source of the magnetic disk unit 30 is switched on and off. The internal information includes, for each of the recording densities, information for defining read/write parameters, a retry table, and a track density, which together determine the head/cylinder SLIP (Subroutine Library for Image Processing) value, a thermal position correction, a seek correction, a write frequency.

Table 1 shows a typical list of the parameters stored in the flash ROM 2, where the possible recording densities of the recording medium are 12 sectors per track and 16 sectors per track.

TABLE 1

| Recording Density Parameter | 12 sectors/track | 16 sectors/track |
|---|---|---|
| Read/Write Parameter | a1 | b1 |
| P2 | a2 | b2 |
| . | | |
| . | | |
| . | | |
| Pn | an | bn |

When the recording density is 12 sectors per track, a1 would be selected as the read/write parameter, a2 as the parameter P2, . . . , and an as the parameter Pn. When the recording density of the magnetic disk is 16 sectors per track, b1 would be selected as the read/write parameter, b2 as the parameter P2, . . . , and bn as the parameter Pn.

The internal information also includes track-capacity/zone information which is used in the MCU 1 to determine the number of sectors per track in each zone and to generate a track map. The track-capacity/zone information is stored in the RAM 3 and the flash ROM 2. The track-capacity/zone information is also made up of a plurality of values for each of the recording densities to be controlled. The track-capacity/zone information is used for producing a track map (Data Wedge Format Table) described later.

The internal information also includes the track map (DWFT), which is the map information on the servomechanism and sectors of each zone, and is used in all data sector processes. The track map is produced by the MCU 1 based on the internal information when the magnetic disk unit 30 is switched on, and is stored in the data buffer 5, including a recording density corresponding to the drive currently in operation.

Figure 4:
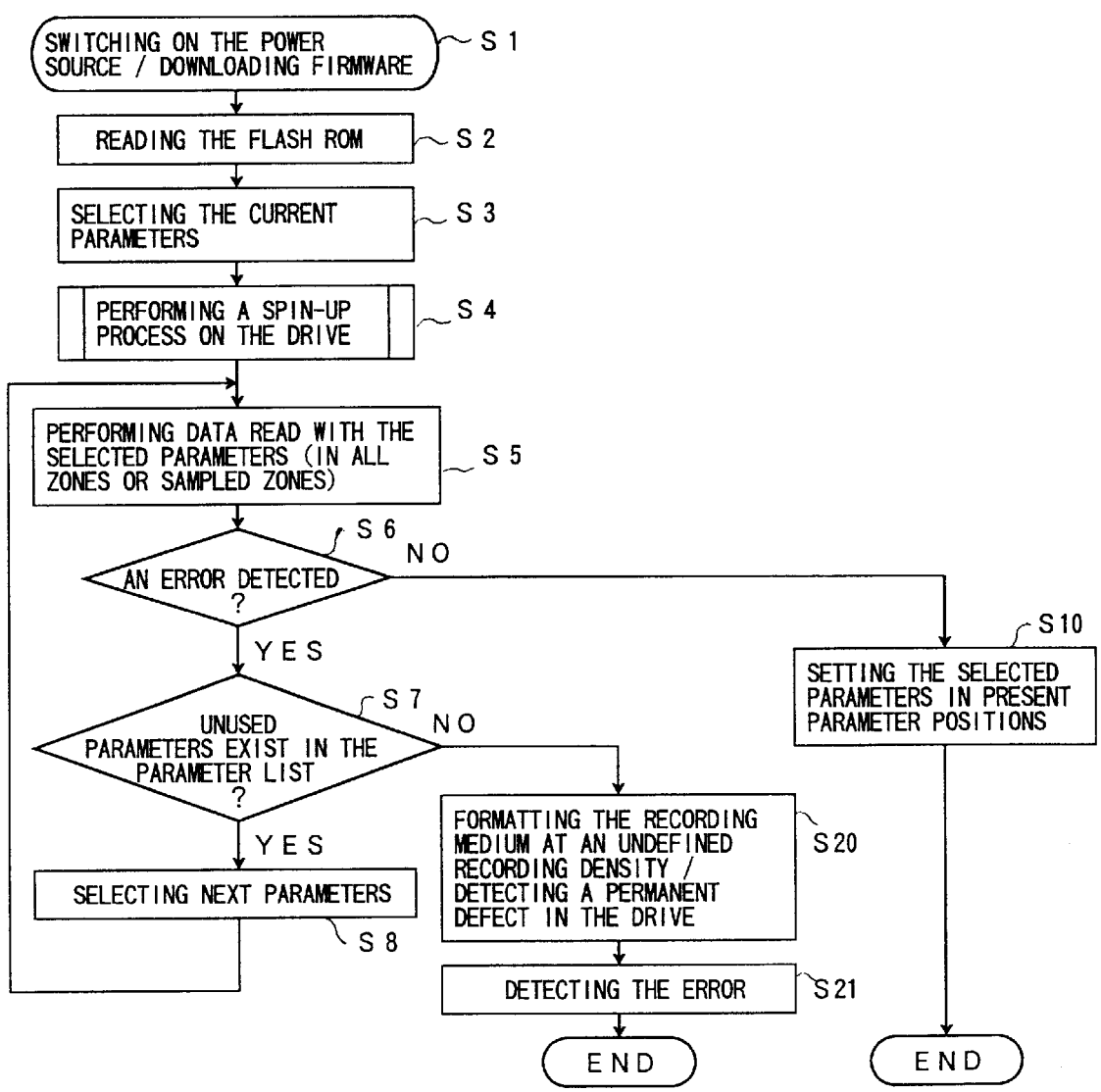

The flowchart of FIG. 4 illustrates the operation of the magnetic disk unit 30 of the present invention as the unit is switched on.

In step S1, the MCU 1 detects whether the magnetic disk unit 30 has been switched on or new firmware has been downloaded (New firmware is transferred through the SCSI interface in compliance with an SCSI command, and the magnetic disk unit is automatically restarted after any such transfer).

In step S2, the MCU 1 searches the parameters stored in the flash ROM 2. In step S3, the MCU 1 detects a position of the parameters currently stored in the flash ROM 2, and selects the read/write parameter and the track capacity per zone stored in the current parameter position.

In step S4, a disk drive spin-up process is carried out, and sampling is performed. In step S5, in accordance with the selected parameters, the data in all the zones or sampled zones are read out.

In step S6, it is determined whether there has been an error in the data read operation or whether the data read operation of step S5 has been retried. If the data read operation has been performed without error or retry, step S10 is performed. In step S10, the previously selected parameters are written to the current parameter position in the flash ROM 2. The magnetic disk unit then ceases operation.

If it is determined in step S6 that there has been an error in the data read operation or that the data read operation has been retried, step S7 is performed. In step S7, the MCU 1 determines whether there is an unused set of parameters in the flash ROM 2.

If it is determined in step S6 that there is an untried set of parameters in the flash ROM 2, in step S8, the unused set of parameters is selected. The operation then returns to step S5, in which a data read operation is retried with the newly selected parameters.

If it is determined in step S7 that there is no unused set of parameters in the flash ROM 2, step S20 is performed. In step S20, the recording medium is formatted at an undefined recording density that is not stored in the flash ROM 2, or it is determined that there is a permanent defect in the drive. In this case, the operation moves to step S21, in which the MCU 1 reports the error detection via the SCSI interface, and reports the error to all subsequent access commands, thereby inhibiting subsequent read/write operations.

Figure 5:
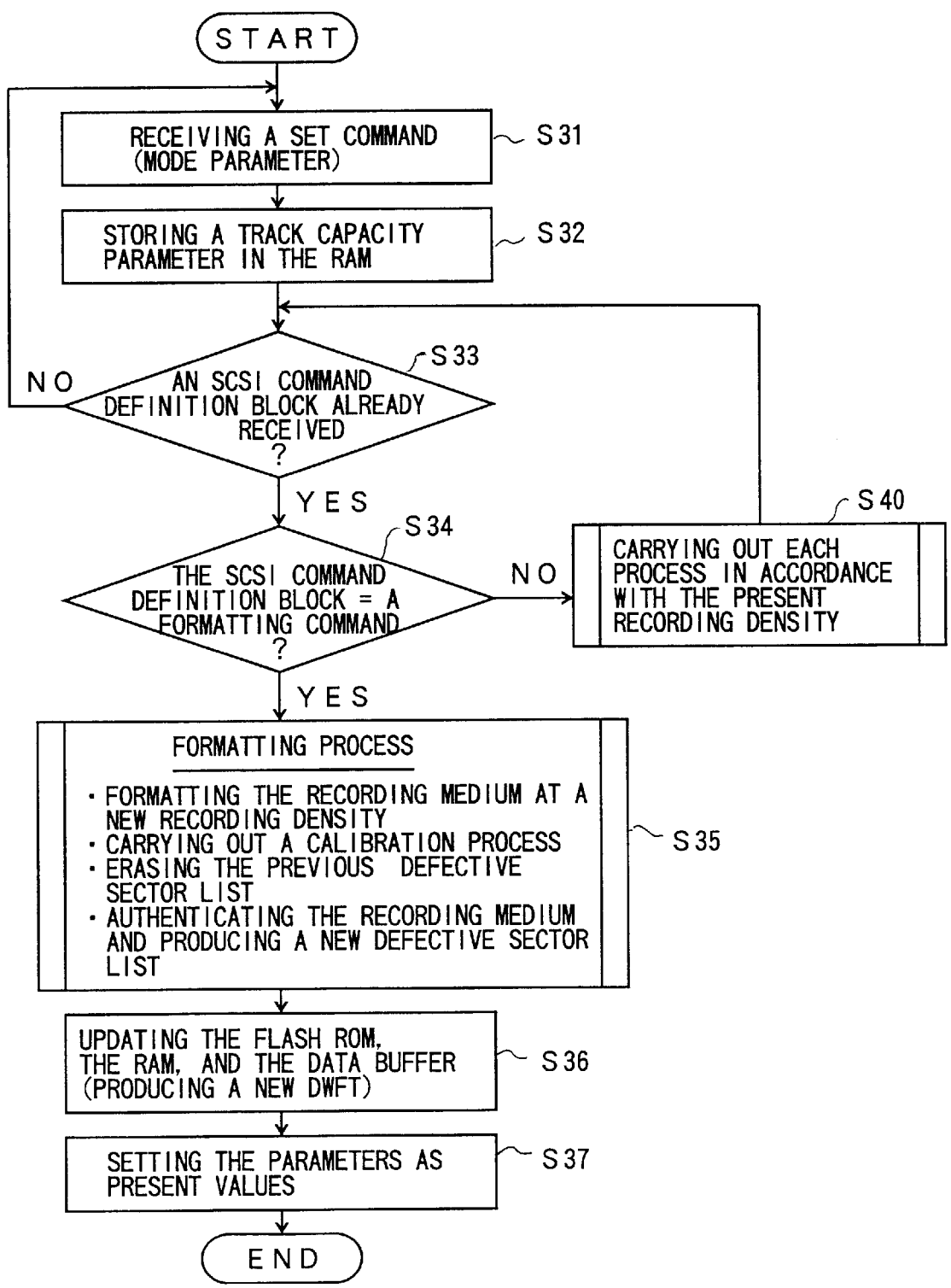
FIG. 5 is a flowchart of the operation of the magnetic disk unit of the present invention when the magnetic disk is formatted.

The flowchart of FIG. 5 illustrates the operation of the magnetic disk unit in accordance with the present invention as the magnetic disk is formatted.

In step S31, the MCU 1 receives, via the SCSI interface, a control command (mode parameter) including the recording density information of the magnetic disk. The control command may, for example, be the 4-byte mode select command shown in Table 2.

TABLE 2

| Byte | Name/Meaning | Code/Meaning |
| --- | --- | --- |
| 0th byte | page code | |
| 1st byte | parameter length | X' 02' |
| 2nd byte | track capacity | X' 01' +1% correction |
| | | X' 0a' +10% correction |
| | | X' F6' −10% correction |
| 3rd byte | unused | unused |

As shown in Table 2, the second byte of the control command defines the track capacity (recording density). For instance, if the second byte is "X'01'", a command to increase the track capacity by 1% is issued to the magnetic disk unit 30.

If a parameter beyond the correction limit of the track capacity is selected, the magnetic disk unit 30 indicates an error and ceases its operation.

In step S32, a parameter defining the track capacity is supplied by the MCU 1 and temporarily stored in the RAM 3, and the command process is completed. In step S33, it is determined whether the MCU 1 has already received an SCSI command definition block. If the MCU has not, the operation returns to the step S31, in which the MCU 1 again receives a setting command (mode parameter). In step S31, the previously supplied setting command is discarded, as it would be when the power source is switched off.

If it is determined in step S33 that the MCU 1 has already received an SCSI command definition block, the operation moves to step S34. In step 34, it is determined whether the SCSI command definition block is a formatting command.

If it is determined in step S34 that the SCSI command definition block is a read/write command, instead of a formatting command, the operation moves on to step S40, in which processes in accordance with the access commands based on the current recording density are carried out. The operation then returns to step S33.

If it is determined in step S4 that the SCSI command definition block is a formatting command, the operation moves to step S35.

In step S35, the magnetic disk is formatted at a recording density defined by the formatting command.

Figure 2A:
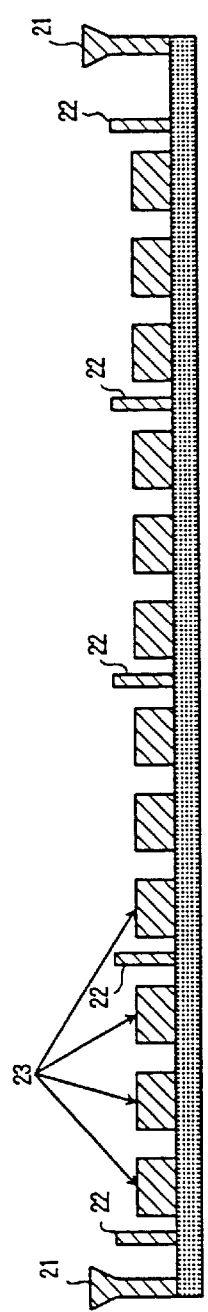
FIGS. 2A and 2B show track formats of information each recorded a magnetic disk by a conventional embedded servo technique.
Figure 2B:
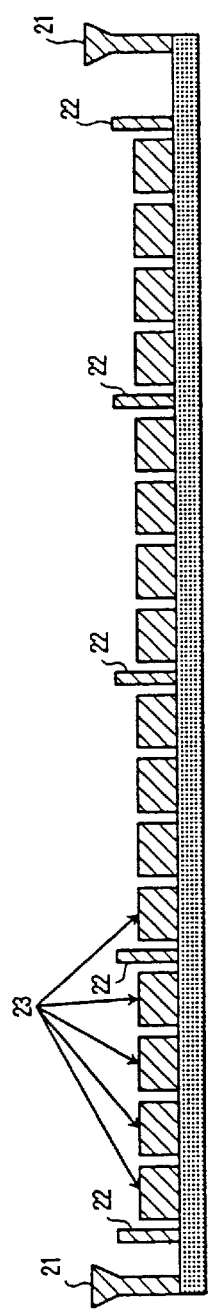

In this formatting process, the data sectors in each track of the magnetic disk are physically rearranged. That is, the positional relationship between the servo frames 22 and the data sectors 23 on the magnetic disk shown in FIG. 2 are changed. The unused gaps between the data sectors might be changed to data sectors through the new formatting process, and the data sectors previously registered as defective sectors might be eliminated.

In the new format, it is necessary to nullify the previous defective sector list showing the addresses of the defective data sectors and to produce a new defective sector list in the new format. Accordingly, during the formatting process in step S35, the previous defective sector list is erased, and a new defective sector list is produced after authentication of the magnetic disk. During the formatting process in step S35, the internal information is updated and a calibration process is carried out to correct the position of the head 32.

In step S36, the parameters used in the formatting process in step S35 and the track capacity of each zone are written to the flash ROM 2 and the RAM 3. A new track map is produced based on the new track capacity of each zone.

In step S7, the parameters newly stored in the flash ROM 2 are set in the position of the parameters currently stored in the flash ROM 2. The operation then comes to an end.

Figure 6:
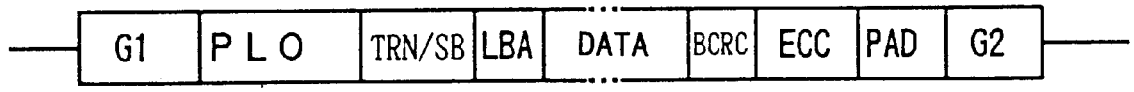
FIG. 6 shows an example data sector format in accordance with the present invention.

FIG. 6 shows an example data sector format in accordance with the present invention. As shown in FIG. 6, this data sector format includes a plurality of areas. Among these areas, areas G1 and G2 are gaps between the data sectors 23 and gaps between the servo frames 22 and the data sectors 23. At the time of formatting, erase data is written in the areas G1 and G2.

An area PLO stores a pattern "00h" having a predetermined byte length required for a PLO synchronizing signal. An area TRN/SB stores a 4-byte synchronizing byte pattern. An area LBA stores a logic block address of the data sector. An area BCRC stores a CRC code for detecting an error during data communication. An area ECC stores a 40-byte Reed-Solomon code for detecting and correcting a data error, and is used for performing an ECC correction (on-the-fly correction). An area PAD stores a pattern "00h" at a time of formatting or writing, and is used for securing a time from the last byte read until the write splice.

User data is actually read and written in the data area of the data sector. The length of the data area is determined by a mode select command. The data area includes an even number of bytes, and the largest possible number of bytes in any sector is 972. In the formatting process, the pattern "00h" is written in the data area.

In the magnetic disk unit of the present invention, optimum data read/write operation can be performed regardless of the recording density of the recording medium. In response to an external formatting command, the recording density of the recording medium can be set at a desired value.

The present invention is not limited to the specifically disclosed embodiments, but variations and modifications may be made without departing from the scope of the present invention.

The present application is based on Japanese priority application No. 11-240500, filed on Aug. 26, 1999, the entire contents of which are hereby incorporated by reference.

What is claimed is:

1. An information storage apparatus that performs a data read/write operation on a recording medium, the apparatus comprising:
   a storage unit that stores a plurality of control parameters, each parameter corresponding to a different recording density of the recording medium;

a control unit that sets one of the plurality of control parameters stored in the storage unit at a starting time, determines whether the set control parameter is suitable for the data read/write operation, selects the control parameter determined to be suitable for controlling the recording medium among the plurality of control parameters, and performs the data read/write operation using the selected control parameter.

2. The information storage apparatus as claimed in claim 1, wherein the control unit outputs an error signal when each of the plurality of control parameters is determined to be unsuitable for controlling the recording medium, and prevents subsequent data read/write operations on the recording medium.

3. An information storage apparatus, comprising:

a formatting unit that formats a recording medium at a recording density in response to a first input command;

a data read/write unit that performs a data read/write operation on the recording medium formatted by the formatting unit;

a correction unit that corrects a position of a head while the formatting unit is formatting the recording medium; and a list producing unit that erases existing address list data representing a list of addresses having defective data, and produces new address list data of the recording medium formatted at a new recording density, while the formatting unit is formatting the recording medium.

4. The information storage apparatus as claimed in claim 3, wherein the formatting unit nullifies the first input command when receiving a second command different from the first input command or when switched off before receiving a formatting command.

5. The information storage apparatus as claimed in claim 3, wherein the formatting unit performs a data read/write operation on the recording medium at a recording density that has been set before receiving a latest command, when receiving a command to perform a data read/write operation on the recording medium before receiving a formatting command.

6. The information storage apparatus as claimed in claim 3, wherein the formatting unit formats the recording medium at the recording density corresponding to the set command when receiving a formatting command.

7. A method of controlling an information storage apparatus that performs a data read/write operation on a recording medium, said method comprising the steps of:

setting one of a plurality of control parameters, each parameter corresponding to a different one of a plurality of recording densities that the recording medium can have;

determining whether the set control parameter is suitable for reading data from the recording medium;

selecting the control parameter determined to be suitable for reading the data from the recording medium among the plurality of control parameters; and performing the data read/write operation on the recording medium by utilizing the selected control parameter.

8. A method of controlling an information storage apparatus, comprising the steps of:

formatting a recording medium at a recording density corresponding to an input command;

performing a data read/write operation on the formatted recording medium, wherein the formatting step includes the steps of:

correcting a position of a read/write head;

erasing existing address list data which shows a list of addresses having defective data; and producing new address list data of the recording medium formatted at a new recording density.

* * * * *